(12) United States Patent
Watanabe et al.

(10) Patent No.: US 12,134,195 B2
(45) Date of Patent: Nov. 5, 2024

(54) CONTROL DEVICE FOR ROBOT, ROBOT SYSTEM, CONTROL METHOD, AND PROGRAM

(71) Applicant: FANUC CORPORATION, Yamanashi (JP)

(72) Inventors: Daigo Watanabe, Yamanashi (JP); Tomonori Matsushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 300 days.

(21) Appl. No.: 17/758,632

(22) PCT Filed: Jan. 12, 2021

(86) PCT No.: PCT/JP2021/000711
§ 371 (c)(1),
(2) Date: Jul. 12, 2022

(87) PCT Pub. No.: WO2021/145311
PCT Pub. Date: Jul. 22, 2021

(65) Prior Publication Data
US 2023/0053168 A1    Feb. 16, 2023

(30) Foreign Application Priority Data

Jan. 17, 2020  (JP) .................... 2020-006237

(51) Int. Cl.
*B25J 11/00*      (2006.01)
*B25J 9/16*       (2006.01)

(52) U.S. Cl.
CPC .................... *B25J 9/1664* (2013.01)

(58) Field of Classification Search
CPC ..... G05B 19/401; B25J 19/021; B25J 9/1692; B25J 9/1664; B25J 9/1607; B25J 9/1638;
(Continued)

(56) References Cited

U.S. PATENT DOCUMENTS 4,675,502 A    6/1987  Haefner et al.

FOREIGN PATENT DOCUMENTS

JP    S60262214 A    12/1985
JP    H2160486 A     6/1990
(Continued)

OTHER PUBLICATIONS

Gao et al., Study on robot path tracking based on work target area graph, 2010, IEEE, p. 3154-3156 (Year: 2010).*

(Continued)

*Primary Examiner* — Mcdieunel Marc
(74) *Attorney, Agent, or Firm* — HAUPTMAN HAM, LLP

(57) ABSTRACT

A control device for moving a robot and causing the robot to perform a work onto a work target portion includes a reference position acquisition section that acquires a position of the work target portion as a reference position, based on detection data of a sensor that detects the work target portion, a movement direction acquisition section that acquires a movement direction of the robot, a direction determination section that determines a shift direction in which a working position of the robot onto the work target portion is to be shifted from the reference position, based on the movement direction acquired by the movement direction acquisition section, and a robot control section that positions the robot at a target position shifted from the reference position toward the shift direction by a predetermined shift amount, when carrying out the work onto the work target portion.

10 Claims, 7 Drawing Sheets

(58) Field of Classification Search
CPC ...... B25J 9/1641; B25J 25/0019; B25J 13/08; A61B 34/30; A61B 34/74; A61B 2034/2061; A61B 2034/2048; A61B 2034/301; A61B 2034/2055; A61B 2034/2065; A61B 34/76; A61B 34/37; A61B 2090/066; A61B 2090/0818; A61B 2034/2059; A61B 2034/2051

See application file for complete search history.

(56) References Cited

FOREIGN PATENT DOCUMENTS

| | | |
|---|---|---|
| JP | H6246660 A | 9/1994 |
| JP | H06-282321 A | 10/1994 |
| JP | H976065 A | 3/1997 |
| WO | 2018173165 A1 | 9/2018 |

OTHER PUBLICATIONS

Hasunuma et al., The tele-operation of the humanoid robot—workspace extension of the arm with step motion, 2005, IEEE, p. 245-252 (Year: 2005).*

Topp et al., Tracking for following and passing persons, 2005, IEEE, p. 1-7 (Year: 2005).*

Hirano et al., Online Path Planning and Compliance Control of Space Robot for Capturing Tumbling Large Object, 2018, IEEE, p. 2909-2916 (Year: 2018).*

* cited by examiner

CONTROL DEVICE FOR ROBOT, ROBOT SYSTEM, CONTROL METHOD, AND PROGRAM

RELATED APPLICATIONS

The present application is a National Phase of International Application No. PCT/JP2021/000711 filed Jan. 12, 2021, which claims priority to Japanese Application No. 2020-006237, filed Jan. 17, 2020.

TECHNICAL FIELD

The present invention relates to a robot control device, a robot system, a control method, and a computer program.

BACKGROUND ART

Some control methods are known for controlling a robot on detection data of a sensor that detects a work target portion to cause the robot to perform a work onto the work target portion (e.g., PTL 1).

CITATION LIST

Patent Literature

PTL 1: JP 06-246660 A

SUMMARY OF THE INVENTION

Technical Problem

From a viewpoint such as improving the quality of work or avoiding interference between the robot and environmental objects, it may be desired to slightly shift a working position of the robot from the work target portion. In such a case, there is a demand for a technique that can appropriately determine a shift direction in which the working position is to be shifted.

Means for Solving the Problem

In an aspect of the present disclosure, a control device configured to move a robot and causing the robot to perform a work onto a work target portion includes a reference position acquisition section configured to acquire a position of the work target portion as a reference position, based on detection data of a sensor configured to detect the work target portion, a movement direction acquisition section configured to acquire a movement direction of the robot, a direction determination section configured to determine a shift direction in which a working position of the robot onto the work target portion is to be shifted from the reference position, based on the movement direction acquired by the movement direction acquisition section, and a robot control section configured to position the robot at a target position shifted from the reference position acquired by the reference position acquisition section toward the shift direction determined by the direction determination section by a predetermined shift amount, when carrying out the work onto the work target portion.

In another aspect of the present disclosure, a control method of moving a robot and causing the robot to perform a work onto a work target portion includes acquiring a position of the work target portion as a reference position, based on detection data of a sensor configured to detect the work target portion, acquiring a movement direction of the robot, determining a shift direction in which a working position of the robot onto the work target portion is to be shifted from the reference position, based on the acquired movement direction, and positioning the robot at a target position shifted from the acquired reference position toward the determined shift direction by a predetermined shift amount, when carrying out the work onto the work target portion.

In yet another aspect of the present disclosure, a computer program, in order to move a robot and cause the robot to perform a work onto a work target portion, causes a computer to function as a reference position acquisition section configured to acquire a position of the work target portion as a reference position, based on detection data of a sensor configured to detect the work target portion, a movement direction acquisition section configured to acquire a movement direction of the robot, a direction determination section configured to determine a shift direction in which a working position of the robot onto the work target portion is to be shifted from the reference position, based on the movement direction acquired by the movement direction acquisition section, and a robot control section configured to position the robot at a target position shifted from the reference position acquired by the reference position acquisition section toward the shift direction determined by the direction determination section by a predetermined shift amount, when carrying out the work onto the work target portion.

Effects of the Invention

According to the present disclosure, for example, when it is desired to shift the working position from the work target portion in order to improve the quality of work or avoid interference between the robot and environmental objects, the shift direction can be appropriately determined taking the movement direction of the robot into account.

DESCRIPTION OF EMBODIMENTS

Figure 1:
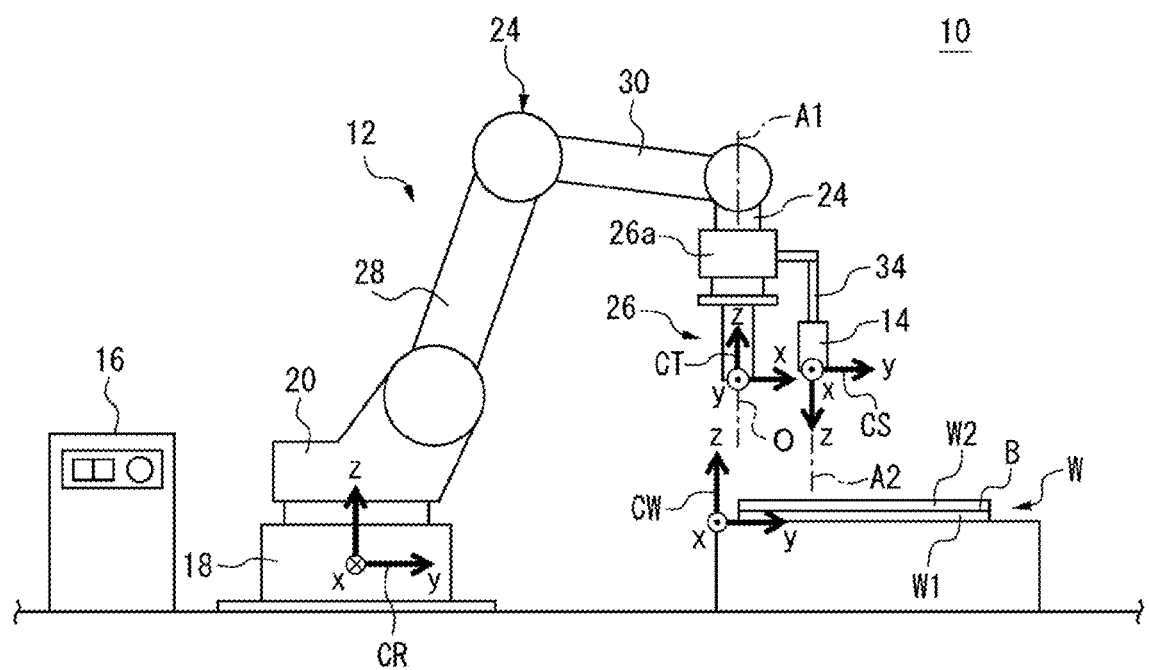
FIG. 1 is a diagram of a robot system according to an embodiment.

Hereinafter, embodiments of the present disclosure will be described in detail with reference to the drawings. In various embodiments described below, the same elements are denoted by the same reference numerals and duplicate description will be omitted. First, a robot system 10 according to an embodiment will be described with reference to FIGS. 1 and 2. The robot system 10 includes a robot 12, a sensor 14, and a control device 16.

In the present embodiment, the robot 12 is a vertical articulated robot and includes a robot base 18, a swivel body 20, a robot arm 22, a wrist 24, and an end effector 26. The robot base 18 is fixed to the floor of a work cell. The swivel body 20 is provided on the robot base 18 such that it is swivelable around a vertical axis. The robot arm 22 has a lower arm 28 rotatably provided on the swivel body 20 and an upper arm 30 rotatably provided on a distal end of the lower arm 28. The wrist 24 is connected to a distal end of the upper arm 30 and rotates the end effector 26 around an axial line A1.

A plurality of servomotors 32 (in FIG. 1) are provided in the components of the robot 12 (the robot base 18, the swivel body 20, the robot arm 22, and the wrist 24). The servomotors 32 each drive the corresponding movable component (the swivel body 20, the robot arm 22, or the wrist 24) of the robot 12 around the drive shaft of the component in response to a command from the control device 16.

The end effector 26 is, for example, a cutting tool, a laser processing head, a welding torch, or a liquid agent applicator, and is detachably attached to the wrist 24. The end effector 26 performs predetermined work (such as cutting, laser processing, welding, or liquid agent application) on a work piece W.

The sensor 14 is a three-dimensional sensor that detects the shape of an object such as the work piece W that will be described later and measures the distance to the object. In the present embodiment, the sensor 14 is a laser scanner type three-dimensional sensor having an emitter that emits light (e.g., laser light) along an optical axis A2 and an imaging sensor (such as a CCD or a CMOS) that receives and photoelectrically converts the light reflected by an object, and is fixed to a base 26a of the end effector 26 via an attachment 34.

The control device 16 controls the operations of the robot 12 and the sensor 14. Specifically, the control device 16 is a computer having a processor 40, a memory 42, and an I/O interface 44. The processor 40 has a CPU, a GPU, or the like and is communicatively connected to the memory 42 and the I/O interface 44 via a bus 45.

The processor 40 performs arithmetic processing for implementing functions of the robot system 10, which will be described later, while communicating with the memory 42 and the I/O interface 44. The memory 42 has a ROM, a RAM, or the like and temporarily or permanently stores various data. The I/O interface 44 has an Ethernet (trade name) port, a USB port, an HDMI (trade name) terminal, or the like and communicates data with an external device under commands from the processor 40.

The servomotors 32 and the sensor 14 of the robot 12 described above are communicatively connected to the I/O interface 44 by wire or wirelessly and the processor 40 transmits commands to each servomotor 32 and the sensor 14 via the I/O interface 44. In the present embodiment, the display device 46 and the input device 48 are communicatively connected to the I/O interface 44 by wire or wirelessly.

The display device 46 includes an LCD, an organic EL display, or the like and the processor 40 transmits image data to the display device 46 via the I/O interface 44 and causes the display device 46 to display an image. The input device 48 includes a keyboard, a mouse, a touch sensor, or the like and transmits input information that has been input by the operator to the I/O interface 44. The display device 46 and the input device 48 may be provided integrally with the control device 16 or may be provided separately from the control device 16.

A robot coordinate system CR is set in the robot 12. The robot coordinate system CR is a control coordinate system for the control device 16 to automatically control each movable component of the robot 12. In the present embodiment, the robot coordinate system CR is set with respect to the robot 12 such that the origin of the robot coordinate system CR is located at the center of the robot base 18 and the z axis of the robot coordinate system CR coincides with the swivel axis of the swivel body 20.

On the other hand, a tool coordinate system CT is set in the end effector 26. This tool coordinate system CT is a control coordinate system for automatically controlling the position and orientation of the end effector 26 in the robot coordinate system CR. In the present embodiment, the tool coordinate system CT is set with respect to the end effector 26 such that the origin of the tool coordinate system CT is located at the center of a working end of the end effector 26 (a so-called TCP) and the z axis of the tool coordinate system CT is parallel to (specifically, coincides with) the axial line A1.

For example, when the end effector 26 is a laser processing head, a welding torch, or a liquid agent applicator, the working end of the end effector 26 is a laser light emitting port of a nozzle of the laser processing head, a tip of the welding torch, or a liquid agent injection port of the liquid agent applicator and outputs a laser beam, a welding wire, or a liquid agent (such as an adhesive, a coating material, or a coating liquid) from the working end along an output axis O. In this case, the z axis of the tool coordinate system CT is set such that it is parallel to (specifically, coincides with) the output axis O. Alternatively, when the end effector 26 is a cutting tool, the working end of the end effector 26 is, for example, a center point (or a tip point) of the cutting tool.

The control device 16 operates each movable component of the robot 12 such that the position and orientation of the end effector 26 match a position and orientation defined in the tool coordinate system CT. In this way, the end effector 26 is moved by the robot 12 and placed at an arbitrary position and orientation in the robot coordinate system CR.

A work piece coordinate system CW is set in the work piece W. The work piece coordinate system CW is a control coordinate system for controlling the position of the end effector 26 with respect to the work piece W. In the present embodiment, the work piece coordinate system CW is fixedly set with respect to the work piece W such that the z-axis direction of the work piece coordinate system CW is parallel to the vertical direction.

A sensor coordinate system CS is set in the sensor 14. The sensor coordinate system CS is a control coordinate system that defines the position of the sensor 14 and the direction of the optical axis A2 for acquiring detection data for control of the robot 12 and is set with respect to the sensor 14 such that the z axis of the sensor coordinate system CS coincides with the optical axis A2 of the sensor 14. The positional relationship between the sensor coordinate system CS and the tool coordinate system CT is known by calibration. Due to this known positional relationship, the coordinates of the sensor coordinate system CS and the coordinates of the tool coordinate system CT can be converted into each other via first coordinate conversion data (e.g., the Jacobian determinant).

The coordinates of the robot coordinate system CR and the coordinates of the tool coordinate system CT can be converted into each other via second coordinate conversion data (e.g., the Jacobian determinant). Thus, the coordinates of the sensor coordinate system CS and the coordinates of the robot coordinate system CR can be converted into each other via the tool coordinate system CT. In the present embodiment, the sensor coordinate system CS is set such that the z axis of the sensor coordinate system CS and the z axis of the tool coordinate system CT are parallel to each other.

Figure 3:
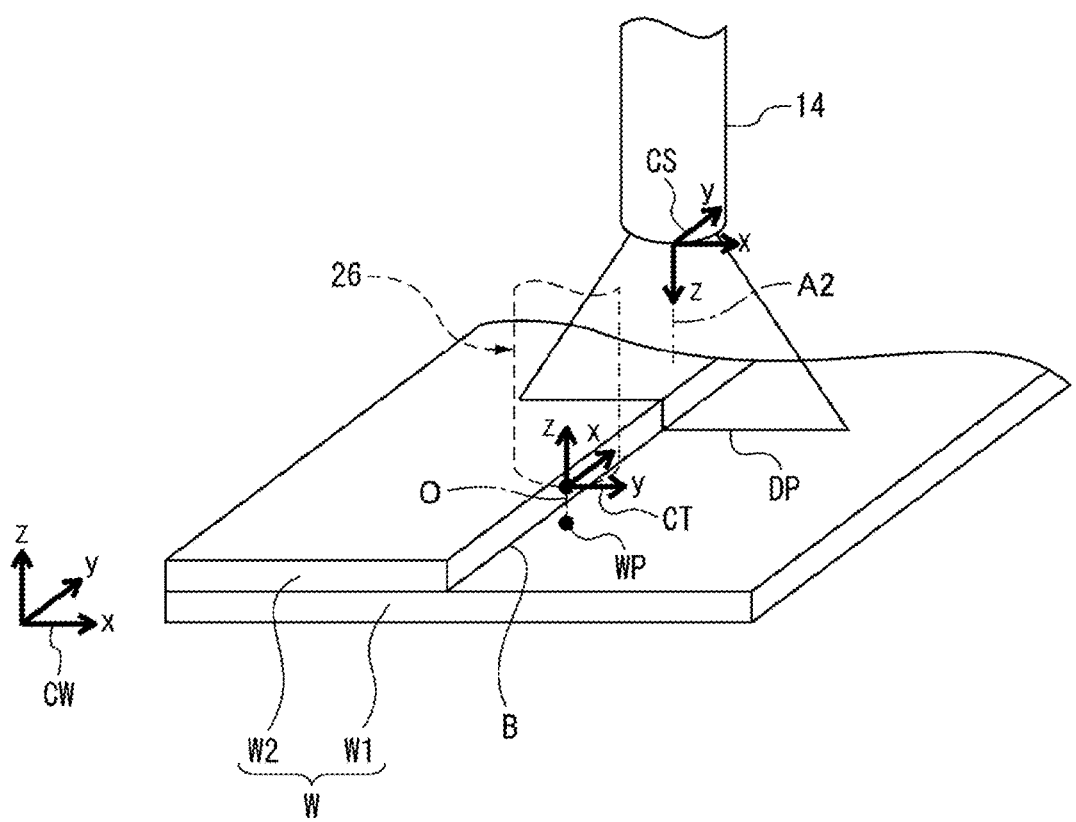
FIG. 3 is a diagram of a work piece according to an embodiment, where an end effector illustrated in FIG. 1 is shown by a dotted line.

The control device 16 moves the end effector 26 of the robot 12 to a work target portion B of the work piece W and causes the end effector 26 to perform a work onto the work target portion B. FIG. 3 shows an example of the work piece W. The work piece W illustrated in FIG. 3 has a first member W1 and a second member W2 mounted on the first member W1.

The first member W1 and the second member W2 are flat plate members installed substantially parallel to the xy plane (i.e., the horizontal plane) of the work piece coordinate system CW. In the present embodiment, the work target portion B is set at a boundary line between a side edge of a bottom surface of the second member W2 and an upper surface of the first member W1 and is arranged such that the work target portion B extends in the y-axis direction of the work piece coordinate system CW.

The control device 16 performs a work onto the work target portion B at a working position WP through the end effector 26 while operating the robot 12 to move the end effector 26 (or the TCP) along the work target portion B in the positive y-axis direction of the work piece coordinate system CW. More specifically, the processor 40 of the control device 16 generates a command to each servomotor 32 of the robot 12 according to a work program MP for causing the robot 12 to perform the work onto the work target portion B.

This work program MP is a computer program and is created in advance, for example, by teaching the robot 12 teaching positions $TP_n$ (n=1, 2, 3, . . . ) at which the end effector 26 (or the TCP) is to be positioned when carrying out the work onto the work target portion B. Position data of the teaching positions $TP_n$ in the robot coordinate system CR, a moving speed at which the end effector 26 is to be moved between two teaching positions $TP_{n-1}$ and $TP_n$, and the like are defined in the work program MP. The work program MP is stored in the memory 42 in advance.

In the present embodiment, the work target portion B is a substantially straight line that extends along the y axis of the work piece coordinate system CW, and the control device 16 performs the work onto the work target portion B in the positive y-axis direction of the work piece coordinate system CW from an end of the work target portion B on the negative y-axis side in the work piece coordinate system CW while moving the end effector 26 parallel to the xy plane of the work piece coordinate system CW.

When the robot 12 performs work, the sensor 14 detects the work target portion B at a position frontward of the working position WP of the end effector 26 in the movement direction of the end effector 26. Specifically, as illustrated in FIG. 3, the sensor 14 irradiates the work piece W with light (laser light) at a position DP frontward of the working position WP in the movement direction of the end effector 26 (which is the positive y-axis direction of the work piece coordinate system CW in the example of FIG. 3) and detects the shape of the work piece W from reflected light from the work piece W, thereby detecting the work target portion B.

Here, when the end effector 26 is caused to perform the work onto the work target portion B, the operator may intentionally shift the working position WP of the end effector 26 from the work target portion B from a viewpoint such as improving the quality of work or avoiding interference between the end effector 26 and surrounding environmental objects (including the work piece W). Thus, the control device 16 according to the present embodiment controls the robot 12 such that the control device 16 shifts the working position WP from the work target portion B when carrying out the work onto the work target portion B.

For example, the processor 40 generates input image data for inputting the shift amount δ of the working position WP and displays the generated input image data on the display device 46. The operator operates the input device 48 to input the shift amount δ, for example, as a numerical value while viewing the input image displayed on the display device 46. The I/O interface 44 receives input information of the shift amount δ from the display device 46. Thus, in the present embodiment, the I/O interface 44 functions as an input receiving section 50 (in FIG. 2) that receives input information of the shift amount δ. The processor 40 acquires the shift amount δ through the I/O interface 44 and stores it in the memory 42.

Next, an example of a process of controlling the robot 12 by the control device 16 will be described with reference to FIG. 4. The process illustrated in FIG. 4 starts when the processor 40 has received a work start command from the operator, a higher-level controller, or a computer program (e.g., the work program MP). At the start of the process illustrated in FIG. 4, the detection position DP of the sensor 14 may be located at the start point of the work target portion B (i.e., the end of the work target portion B on the negative y-axis side in the work piece coordinate system CW).

In step S1, the processor 40 starts acquiring a reference position RP. Specifically, the processor 40 activates the sensor 14, and the sensor 14 starts an operation of detecting the work target portion B and transmitting detection data to the processor 40. In an example, the sensor 14 transmits 3D image data of the sensor coordinate system CS in which the work target portion B is imaged to the processor 40 as detection data. The processor 40 performs image processing on the 3D image data from the sensor 14 to identify the work target portion B and acquires data on a position Ps (specifically, coordinates of the sensor coordinate system CS) of the work target portion B in the sensor coordinate system CS.

In another example, the sensor 14 has an image processing section that processes 3D image data of the sensor coordinate system CS in which the work target portion B is imaged to identify the work target portion B and acquires data on the position Ps (coordinates) of the identified work target portion B in the sensor coordinate system CS. Then, the sensor 14 transmits the data on the position Ps of the work target portion B in the sensor coordinate system CS to the processor 40 as detection data.

The processor 40 converts the acquired position Ps of the sensor coordinate system CS into the robot coordinate system CR to acquire the position RP of the work target portion B in the robot coordinate system CR as a reference position. Thus, in the present embodiment, the processor 40 functions as a reference position acquisition section 52 (in FIG. 2) that acquires the reference position RP, based on the detection data of the sensor 14. After the start of step S1, the sensor 14 continuously detects the work target portion B and the processor 40 continuously acquires the reference position RP until the determination is YES in step S9 that will be described later.

In step S2, the processor 40 starts moving the robot 12. Specifically, the processor 40 generates a position command PC to each servomotor 32 of the robot 12 according to the work program MP to operate each movable component of the robot 12 to move the end effector 26 such that the end effector 26 is arranged at a first teaching position TP1.

In the present embodiment, after the start of this step S2, the processor 40 moves the end effector 26 while controlling the orientation of the end effector 26 such that the z axis of the tool coordinate system CT (or the sensor coordinate system CS) is parallel to the z axis of the work piece coordinate system CW (or the robot coordinate system CR). In step S3, the processor 40 sets a number "n" that specifies an n-th teaching position $TP_n$ to "1".

In step S4, the processor 40 acquires the movement direction $MD_n$ of the robot 12. In an example, after the start of step S2, the processor 40 repeatedly acquires the position EP of the end effector 26 while moving the end effector 26. For example, the processor 40 receives a position feedback FB from a rotation detector (such as an encoder or a Hall element) provided in each servomotor 32 and then can acquire the position EP of the end effector 26 (or the TCP) in the robot coordinate system CR through calculation based on the position feedback FB.

Alternatively, a position measuring device capable of measuring the position of the end effector 26 in the robot coordinate system CR may be provided and the processor 40 may acquire the position EP of the end effector 26 measured by the position measuring device. For example, the position measuring device has a camera provided in the end effector 26, and the processor 40 can calculate the position EP of the end effector 26 from image data captured by the camera. Thus, in the present embodiment, the processor 40 functions as a robot position acquisition section 54 (in FIG. 1) that repeatedly acquires the position EP of the robot 12 while the robot 12 (specifically, the end effector 26) is moving.

Next, by using an m-th position $EP_m$ of the end effector 26 acquired at the start (or immediately before the start) of this step S4 and an (m-1)-th position $EP_{m-1}$ of the end effector 26 acquired before the m-th position EP, the processor 40 acquires a movement direction $MD_n$ of the end effector 26 at the start of this step S4 as the direction of a vector from the (m-1)-th position $EP_{m-1}$ to the m-th position $EP_m$.

The processor 40 may acquire the movement direction $MD_n$, using three or more positions $EP_m$. For example, the processor 40 may calculate a sum (or average) of the direction of a vector V3 from a position $EP_{m-3}$ to a position $EP_{m-2}$, the direction of a vector V2 from a position $EP_{m-2}$ to the position $EP_{m-1}$, and the direction of a vector V1 from the position $EP_{m-1}$ to the position $EP_m$ and then acquire the direction of the sum (or average) as the movement direction $MD_n$.

In this way, the processor 40 acquires the movement direction $MD_n$ of the robot 12 (specifically, the end effector 26). Thus, in the present embodiment, the processor 40 functions as a movement direction acquisition section 56 (in FIG. 2). In the present embodiment, the movement direction $MD_n$ is parallel to the xy plane of the work piece coordinate system because the processor 40 moves the end effector 26 parallel to the xy plane of the work piece coordinate system as described above.

In step S5, the processor 40 determines a shift direction $SD_n$ in which the working position WP of the robot 12 is to be shifted from a reference position $RP_n$, based on the movement direction $MD_n$ acquired in the most recent execution of step S4. Specifically, the processor 40 first sets a direction orthogonal to the movement direction $MD_n$ acquired in the most recent execution of step S4 as a reference direction RD.

In the present embodiment, the processor 40 sets the reference direction RD as a direction parallel to the z axis of the work piece coordinate system CW (or the robot coordinate system CR) which is a control coordinate system. Thus, the processor 40 functions as a reference direction setting section 58 (in FIG. 2) that sets the reference direction RD. The operator may operate the input device 48 to input in advance setting information for setting the reference direction RD as a direction parallel to the z axis of the work piece coordinate system CW (or the robot coordinate system CR). The processor 40 may then set the reference direction RD according to the setting information.

Next, the processor 40 determines the shift direction $SD_n$ as a direction orthogonal to the movement direction $MD_n$ and the reference direction RD. For example, the processor 40 can acquire the shift direction $SD_n$ by acquiring a unit vector of a movement direction $MD_n$ that has been most recently acquired and acquiring a unit vector of the reference direction RD that has been set and then calculating the outer product of the unit vector of the movement direction $MD_n$ and the unit vector of the reference direction RD.

Figure 5:
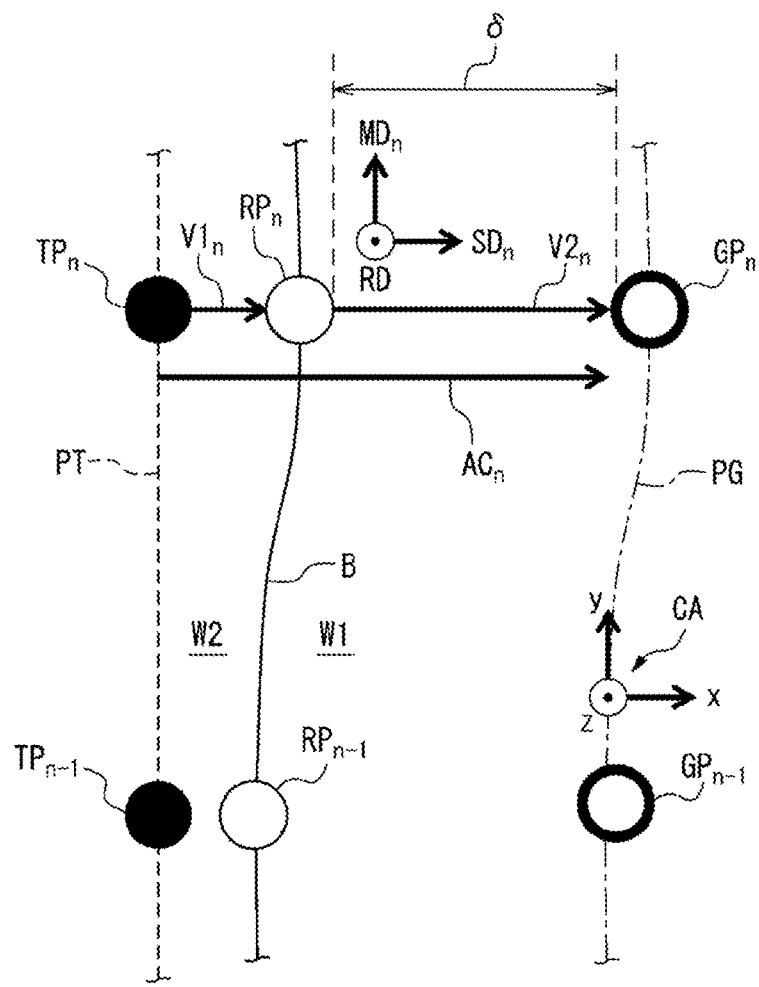
FIG. 5 is a diagram for explaining a method of determining a shift direction in which a working position of a robot is to be shifted from a reference position.

In FIG. 5, arrows indicate the movement direction $MD_n$, the reference direction RD, and the shift direction $SD_n$. In an example illustrated in FIG. 5, the shift direction $SD_n$ is determined as a direction that is orthogonal to the movement direction $MD_n$ and the reference direction RD and toward the right side with respect to the movement direction $MD_n$. Thus, in the present embodiment, the processor 40 functions as a direction determination section 60 (in FIG. 2) that determines the shift direction $SD_n$.

The operator may operate the input device 48 to input in advance setting information for setting whether the shift direction $SD_n$ is a direction toward the left side or the right side with respect to the movement direction $MD_n$. The processor 40 may then determine the shift direction $SD_n$ as a direction toward the left side or the right side with respect to the movement direction $MD_n$ according to the setting information.

In step S6, the processor 40 sets a correction coordinate system CA. Specifically, the processor 40 sets the correction coordinate system CA as an orthogonal coordinate system having an x axis parallel to the shift direction $SD_n$ determined in the most recent execution of step S5, a y axis parallel to the movement direction $MD_n$ acquired in the most recent execution of step S4, and a z axis parallel to the reference direction RD.

The correction coordinate system CA is exemplified in FIG. 5. The processor 40 sets the correction coordinate system CA such that the origin of the correction coordinate system CA is located, for example, at the origin (i.e., the TCP) of the tool coordinate system CT that has been set at this time. Thus, in the present embodiment, the processor 40 functions as a coordinate system setting section 62 (in FIG. 2) that sets the correction coordinate system CA.

In step S7, the processor 40 generates a position correction command $AC_n$ with reference to the correction coordinate system CA. The position correction command $AC_n$ is a command for correcting a position at which the end effector 26 is to be positioned for work from an n-th teaching position $TP_n$ to an n-th target position $GP_n$ in the correction coordinate system CA as illustrated in FIG. 5.

The n-th target position $GP_n$ is a position shifted from the n-th reference position $RP_n$ toward the shift direction $SD_n$ determined in the most recent execution of step S5 by the shift amount δ that is stored in the memory in advance. The n-th reference position $RP_n$ is identified, for example, as a point on the work target portion B detected by the sensor 14 which minimizes the distance from the n-th teaching position $TP_n$.

The processor 40 generates the position correction command $AC_n$ with reference to the correction coordinate system CA based on position data of the n-th teaching position $TP_n$ and the n-th reference position $RP_n$, the shift direction $SD_n$, and the shift amount δ. In an example, the processor 40 uses the position data of the n-th teaching position $TP_n$ and the n-th reference position $RP_n$ to obtain a position correction vector $V1_n$ from the n-th teaching position $TP_n$ to the reference position $RP_n$.

At the same time, the processor 40 uses the position data of the n-th reference position $RP_n$, the shift direction $SD_n$, and the shift amount δ to acquire a position correction vector $V2_n$ of magnitude δ which starts from the n-th reference position $RP_n$ and is directed toward the shift direction $SD_n$. Then, the processor 40 generates a position correction command $AC_n$ as a sum of the position correction vector $V1_n$ and the position correction vector $V2_n$ in the correction coordinate system CA.

In another example, by using the position data of the n-th reference position $RP_n$, the shift direction $SD_n$, and the shift amount δ, the processor 40 determines the n-th target position $GP_n$ to acquire position data (coordinates) of the n-th target position $GP_n$ in the correction coordinate system CA. When the coordinates of the correction coordinate system CA of the n-th reference position $RP_n$ are $(x_A, y_A, z_A)$, the coordinates of the correction coordinate system CA of the n-th target position $GP_n$ are $(x_A+δ, y_A, z_A)$. Then, the processor 40 generates a position correction command $AC_n$, using the position data of the n-th teaching position $TP_n$ and the n-th target position $GP_n$.

The processor 40 converts the generated position correction command $AC_n$ of the correction coordinate system CA into that of the robot coordinate system CR and adds the converted position correction command to a position command $PC_n$ for positioning the end effector 26 to the n-th teaching position $TP_n$ to correct the position command $PC_n$. Then, the processor 40 transmits the corrected position command $PC_n'$ to each servomotor 32. In this way, the processor 40 operates the robot 12 according to the corrected position command $PC_n'$ to move the end effector 26 toward the n-th target position $GP_n$.

In step S8, the processor 40 determines whether the robot 12 has reached the n-th target position $GP_n$. For example, the processor 40 sequentially acquires the position EP of the end effector 26 (the TCP) based on the position feedback FB and monitors the position EP to determine whether the end effector 26 (the TCP) has reached the n-th target position $GP_n$.

The processor 40 proceeds to step S9 upon determining that the robot 12 has reached the n-th target position $GP_n$ (i.e., YES), and on the other hand, loops step S8 upon determining that the robot 12 has not reached the n-th target position $GP_n$ (i.e., NO). Upon determining YES in this step S8 when the number "n" that specifies the n-th teaching position $TP_n$ has been set to "1" at the start of this step S8, the processor 40 activates the end effector 26 to start the work through the end effector 26.

In step S9, the processor 40 determines whether the number "n" that specifies the n-th teaching position $TP_n$ satisfies n=v. Here, v is, for example, the total number of teaching positions $TP_n$ defined in the work program MP. When n=v, the processor 40 determines YES and proceeds to step S11, and on the other hand, when n<v, the processor 40 determines NO and proceeds to step S10. In step S10, the processor 40 increments the number "n" that specifies the n-th teaching position $TP_n$ by "1" (i.e., n=n+1). Then, the processor 40 returns to step S4.

In this way, until the determination is YES in step S9, the processor 40 repeats the loop of steps S4 to S10 to perform work along the work target portion B through the end effector 26 while sequentially positioning the end effector 26 at a first target position $GP_1$, a second target position $GP_2$, ..., and a v-th target position $GP_v$ along a movement path PG different from a teaching path PT (in FIG. 5) defined in the machining program MP. Thus, the processor 40 functions as a robot control section 64 (in FIG. 2) that positions the robot 12 (specifically, the end effector 26) at the target position $GP_n$ when carrying out the work onto the work target portion B.

If the determination is YES in step S9, the processor 40 stops the operation of the end effector 26, thus ending the work. In the present embodiment, the control device 16 determines the shift direction $SD_n$ in which the working position WP of the robot 12 is to be shifted from the reference position $RP_n$, based on the movement direction $MD_n$ of the robot 12 as described above. For example, when it is desired to shift the working position WP from the work target portion B in order to improve the quality of work or avoid the interference between the end effector 26 and environmental objects, this configuration enables the shift direction $SD_n$ to be appropriately determined taking the movement direction $MD_n$ of the robot 12 into account.

Further, in the present embodiment, the control device 16 sets the reference direction RD and determines the shift direction $SD_n$ as a direction orthogonal to the movement direction $MD_n$ and the reference direction RD. This configuration enables the shift direction $SD_n$ to be determined more specifically from the movement direction $MD_n$ and the reference direction RD.

Further, in the present embodiment, the control device 16 sets the reference direction RD as a direction parallel to the z-axis direction of the work piece coordinate system CW (or the robot coordinate system CR) which is a control coordinate system. Thus, the shift direction $SD_n$ can be determined with reference to the work piece coordinate system CW (or the robot coordinate system CR). This configuration enables the operator to easily and intuitively identify the shift direction $SD_n$ because he or she can easily identify the axial direction of the work piece coordinate system CW (or the robot coordinate system CR).

Further, in the present embodiment, the control device 16 sets the correction coordinate system CA based on the shift direction $SD_n$, the movement direction $MD_n$, and the reference direction RD and generates a position correction command $AC_n$ with reference to the correction coordinate system CA. This configuration enables the control device 16 to efficiently generate the position correction command $AC_n$ in the correction coordinate system CA, so that it is possible to increase the processing speed of the loop of steps S4 to S10 in FIG. 4.

Further, in the present embodiment, in step S4 described above, the control device 16 repeatedly acquires the position $EP_m$ of the robot 12 and acquires the movement direction $MD_n$, using a plurality of positions $EP_{m-1}$ and $EP_m$. This configuration enables the movement direction $MD_n$ of the robot 12 to be reliably and quickly acquired. Further, in the present embodiment, the I/O interface 44 functions as input receiving section 50 to receive input information of the shift amount δ in advance. This configuration enables the operator to freely set the shift amount δ in advance.

Figure 4:
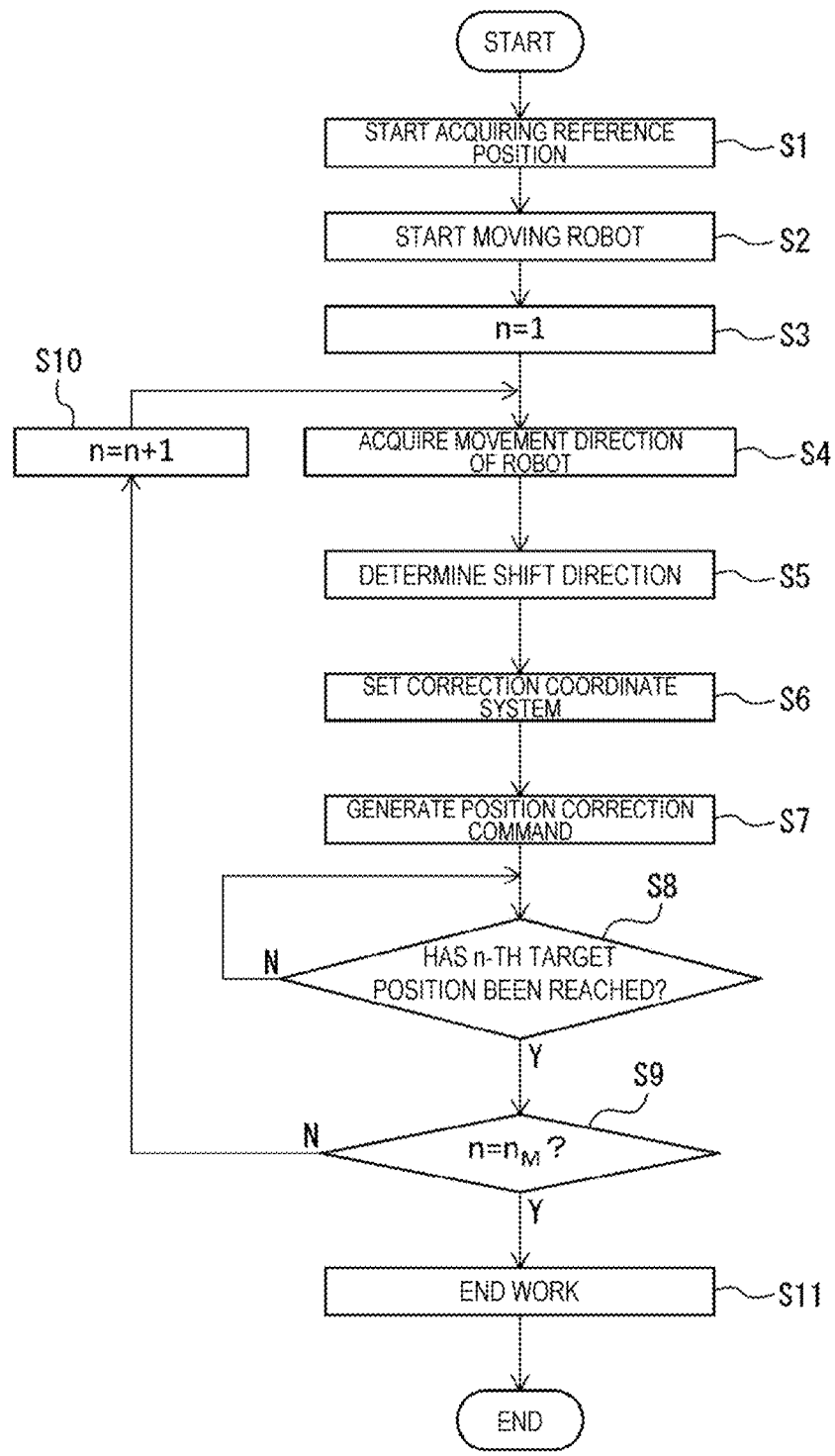
FIG. 4 is a flowchart illustrating an example of an operation process of the robot system illustrated in FIG. 1.

The processor 40 may perform the process illustrated in FIG. 4 according to a computer program that is stored in the memory 42 in advance. This computer program causes the control device 16 (specifically, the processor 40) to function as the reference position acquisition section 52, the robot position acquisition section 54, the movement direction acquisition section 56, the reference direction setting section 58, the direction determination section 60, the coordinate system setting section 62, and the robot control section 64 in order to cause the robot 12 to move and perform the work onto the work target portion B. For example, this computer program may be incorporated into the work program MP described above or may be created separately from the work program MP.

In the embodiment described above, when the loop of steps S4 to S10 is executed an n-th time (where n≥3), in step S4, the processor 40 may use an (n-2)-th target position $GP_{n-2}$ and an (n-1)-th target position $GP_{n-1}$ to acquire the movement direction $MD_n$ of the end effector 26 as the direction of a vector from the (n-2)-th target position $GP_{n-2}$ to the (n-1)-th target position $GP_{n-1}$.

Although the embodiment has been described above with respect to the case where the work target portion B is a substantially straight line, the control device 16 can also appropriately determine a shift direction $SD_n$ for a curved (e.g., arced) work target portion B. Specifically, by executing the process of FIG. 4, the processor 40 can determine a shift direction $SD_n$ based on a movement direction $MD_n$ and generate a position correction command $AC_n$ with reference to a correction coordinate system CA as illustrated in FIG. 6.

Figure 6:
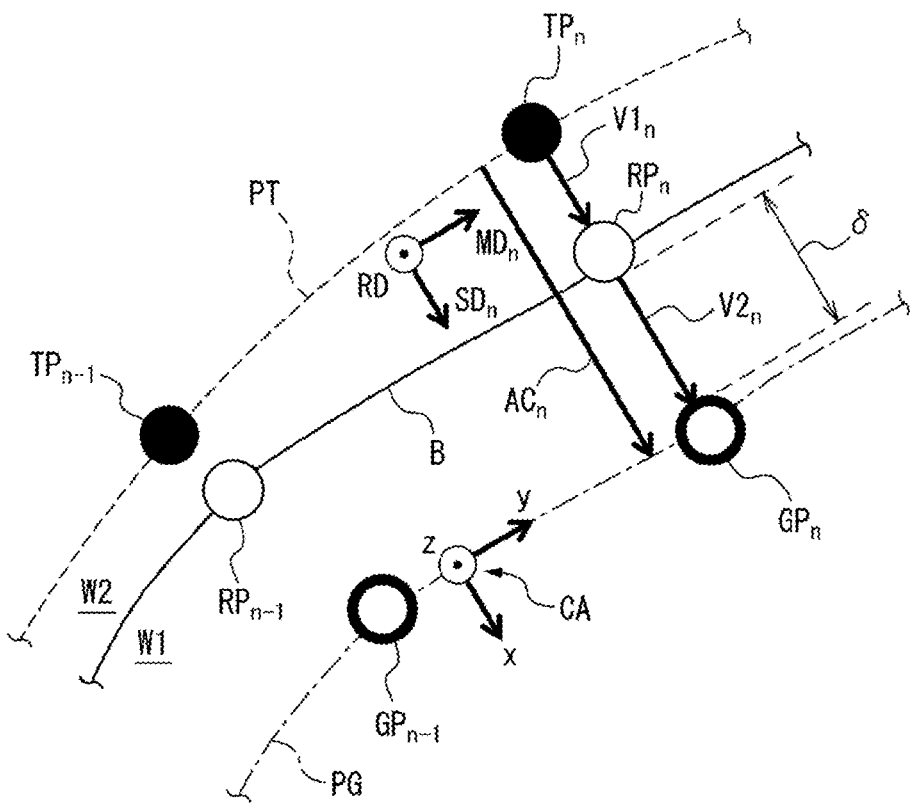
FIG. 6 is a diagram for explaining a method of determining a shift direction in which a working position is to be shifted from a reference position for a curved work target portion.
Figure 6:
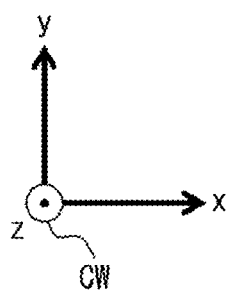

For the case of the curved work target portion B as illustrated in FIG. 6, in step S4 described above, the processor 40 may acquire a tangential direction of a teaching trajectory PT (or a trajectory line of the work target portion B extracted from detection data of the sensor 14) at an n-th teaching position $TP_n$ defined in the machining program MP and acquire the tangential direction as the movement direction $MD_n$.

Figure 7:
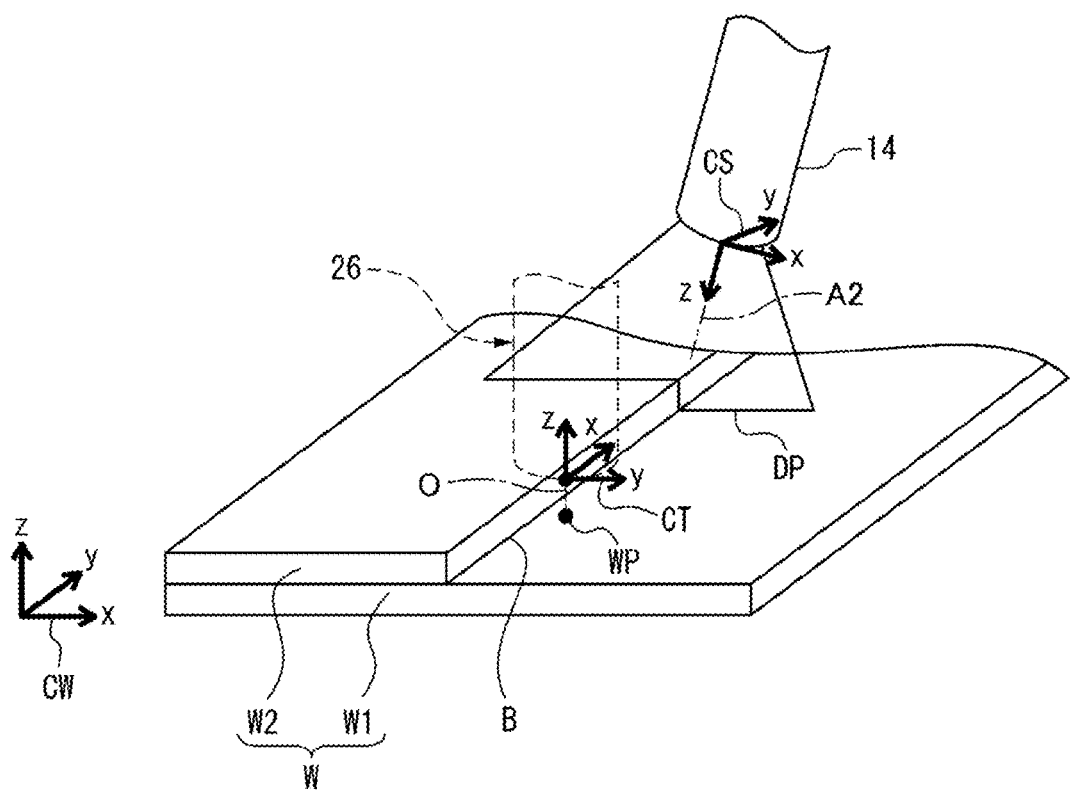
FIG. 7 shows another example of an arrangement of a sensor.

Further, although the sensor 14 is provided such that the optical axis A2 of the sensor 14 is parallel to the z axis of the tool coordinate system CT in the embodiment described above, the sensor 14 may be provided such that the optical axis A2 is inclined with respect to the z axis of the tool coordinate system CT. Such a form is illustrated in FIG. 7. In the form illustrated in FIG. 7, the optical axis A2 of the sensor 14 is inclined with respect to the z axis of the tool coordinate system CT and the z axis of the sensor coordinate system CS is set such that the z axis of the sensor coordinate system CS coincides with the optical axis A2. In such a form, the control device 16 can also determine the shift direction $SD_n$ based on the movement direction $MD_n$ and generate a position correction command $AC_n$ with reference to the correction coordinate system CA by executing the process illustrated in FIG. 4.

Further, in step S5 described above, the processor 40 may set the reference direction RD as a direction parallel to the z axis of the tool coordinate system CT which is a control coordinate system. Alternatively, the processor 40 may set the reference direction RD as a direction parallel to the z axis of the sensor coordinate system CS or may set the reference direction RD as a direction parallel to one axis (e.g., the z axis) of a world coordinate system which is a control coordinate system defining the three-dimensional space of the work cell.

Further, although the embodiment has been described above with respect to the case where the processor 40 moves the end effector 26 parallel to the xy plane of the work piece coordinate system CW, the present disclosure is not limited to this and the processor 40 may move the end effector 26 non-parallel to the xy plane of the work piece coordinate system CW. For example, a teaching trajectory PT from an (n-1)-th teaching position $TP_{n-1}$ to an n-th teaching position $TP_n$ may be non-parallel to the xy plane of the work piece coordinate system CW.

In this case, in step S5 described above, the processor 40 acquires a component $MD_n'$ of the movement direction $MD_n$ acquired in the most recent execution of step S4, the component being parallel to the xy plane of the work piece coordinate system CW. The processor 40 also sets the reference direction RD as described above. Next, the processor 40 may determine a shift direction $SD_n$ as a direction orthogonal to the component $MD_n'$ and the reference direction RD.

Alternatively, in step S5 described above, the processor 40 may first set a direction, which is orthogonal to the movement direction $MD_n$ acquired in the most recent execution of step S4 and is parallel to the yz plane of the work piece coordinate system CW (or the robot coordinate system CR), as the reference direction RD. Next, the processor 40 may determine the shift direction $SD_n$ as a direction orthogonal to the movement direction $MD_n$ and the reference direction RD. The processor 40 can execute steps S6 and S7 described above based on the shift direction $SD_n$ determined in this way, the movement direction $MD_n$, and the reference direction RD.

Further, the sensor 14 is not limited to the laser scanner type three-dimensional sensor described above and may be, for example, a three-dimensional vision sensor having a plurality of cameras and an image processing section that measures the distance from image data of an object captured by the plurality of cameras to the object or may be any type of sensor capable of detecting the work target portion B.

Further, in the embodiment described above, the n-th target position $GP_n$ may be set to a position shifted from the n-th reference position $RP_n$ by the shift amount δ toward the shift direction $SD_n$ determined in step S5 and by a predetermined shift amount δ' in the positive z-axis direction of the work piece coordinate system CW (or the robot coordinate system CR). In this case, when the coordinates of the correction coordinate system CA of the n-th reference position $RP_n$ in FIG. 5 are ($x_A$, $y_A$, $z_A$), the coordinates of the correction coordinate system CA of the n-th target position $GP_n$ are ($x_A$+δ, $y_A$, $z_A$+δ').

In this case, the operator may operate the input device 48 to input the shift amount δ', for example, as a numerical value and the I/O interface 44 may function as the input receiving section 50 to receive input information of the shift amount δ'. Then, in step S7 described above, the processor 40 may determine the n-th target position $GP_n$, using position data of the n-th reference position $RP_n$, the shift direction $SD_n$, and the amounts of shifts δ and δ' and generate a position correction command $AC_n$.

Further, the embodiment has been described above with respect to the case where the work target portion B is set at a boundary line between a side edge of the bottom surface of the second member W2 and the upper surface of the first member W1. However, the work target portion B may also be set on a side edge of the upper surface of the second member W2. Then, the n-th target position $GP_n$ may be set to a position shifted from the n-th reference position $RP_n$ by the shift amount δ toward the shift direction $SD_n$ determined in step S5 and by a predetermined shift amount δ" in the negative z-axis direction of the work piece coordinate system CW (or the robot coordinate system CR).

In this case, when the coordinates of the correction coordinate system CA of the n-th reference position $RP_n$ in FIG. 5 are $(x_A, y_A, z_A)$, the coordinates of the correction coordinate system CA of the n-th target position $GP_n$ are $(x_A+\delta, y_A, z_A-\delta'')$. In this case, the operator may operate the input device 48 to input the shift amount $\delta''$, for example, as a numerical value and the I/O interface 44 may function as the input receiving section 50 to receive input information of the shift amount $\delta''$. Then, in step S7 described above, the processor 40 may determine the n-th target position $GP_n$, using position data of the n-th reference position $RP_n$, the shift direction $SD_n$, and the amounts of shifts $\delta$ and $\delta''$ and generate a position correction command $AC_n$.

Figure 2:
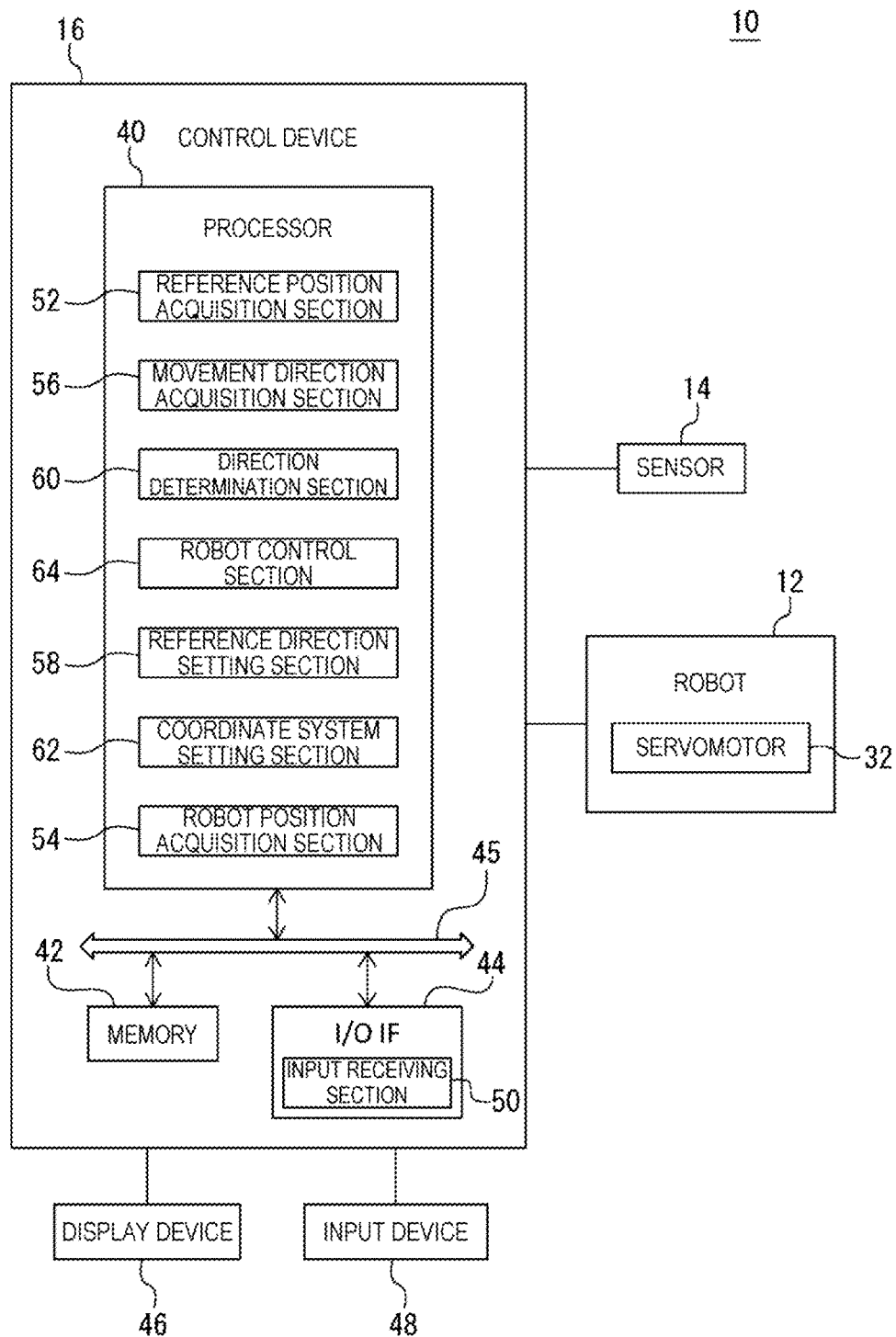
FIG. 2 is a block diagram of the robot system illustrated in FIG. 1.

Further, the reference direction setting section 58 can be omitted from the embodiment illustrated in FIG. 2. In this case, in step S5 described above, the processor 40 may determine the shift direction $SD_n$ as a direction orthogonal to the movement direction $MD_n$ and parallel to the xy plane of the work piece coordinate system CW (or the robot coordinate system CR). Alternatively, the processor 40 may determine the shift direction $SD_n$ as a direction inclined by a predetermined angle $\theta$ with respect to the movement direction $MD_n$. Information on the angle $\theta$ can be stored in the memory 42 in advance.

Further, the coordinate system setting section 62 can be omitted from the embodiment illustrated in FIG. 2. In this case, step S6 may be omitted from the process illustrated in FIG. 4 and the processor 40 may generate a position correction command $AC_n$, for example, with reference to the tool coordinate system CT or the robot coordinate system CR in step S7 described above.

Further, the teaching position $TP_n$ (n=1, 2, 3, ...) defined in the work program MP can be omitted while the coordinate system setting section 62 is omitted from the embodiment illustrated in FIG. 2. In this case, steps S6 and S7 can be omitted from the process of FIG. 4. Specifically, in step S5, the processor 40 determines a shift direction $SD_n$ in which a shift is to be made from the n-th reference position $RP_n$, based on the movement direction $MD_n$ acquired in the most recent execution of step S4 and then determines the n-th target position $GP_n$, using position data of the n-th reference position $RP_n$, the shift direction $SD_n$, and the shift amount $\delta$.

Then, the processor 40 acquires position data (coordinates) of the n-th target position $GP_n$ in the robot coordinate system CR, generates a position command PC to each servomotor 32 according to the position data, and moves the end effector 26 toward the n-th target position $GP_n$. As described above, in the present embodiment, the processor 40 sequentially generates a position command PC for positioning the end effector 26 to the n-th target position $GP_n$ based on the reference position $RP_n$ without generating the position correction command $AC_n$ described above.

Further, the robot position acquisition section 54 can be omitted from the embodiment illustrated in FIG. 2. In an example, the processor 40 may acquire the direction of a vector from an (n-1)-th reference position $RP^{n-1}$ to the n-th reference position $RP_n$ as the movement direction $MD_n$ based on detection data of the sensor 14 in step S4 described above. Alternatively, the processor 40 may extract a trajectory line of the work target portion B from detection data of the sensor 14, acquire a tangential direction of the trajectory line at the n-th reference position $RP_n$, and acquire the tangential direction as the movement direction $MD_n$.

In another example, the processor 40 may acquire the movement direction $MD_n$ of the robot 12 from the position command PC to each servomotor 32. Specifically, the processor 40 may acquire a movement direction $MD_n$ of the end effector 26 at the start of this step S4 from both a position command $PC_m$ that has been transmitted to the servomotor 32 at the start (or immediately before the start) of this step S4 and a position command $PC_{m-1}$ that has been transmitted to the servomotor 32 before the position command $PC_m$.

In yet another example, the processor 40 may acquire the movement direction $MD_n$ of the robot 12 from the work program MP. For example, the processor 40 may acquire a teaching path PT (FIG. 5) of the end effector 26 at the start (or immediately before the start) of step S4 from the teaching position TP defined in the work program MP and acquire a movement direction $MD_n$ of the end effector 26 at this time from the teaching path PT.

As described above, the processor 40 can acquire the movement direction $MD_n$, using any of the position feedback FB, the position command PC, the machining program MP (the teaching position TP and the teaching path PT), and detection data of the sensor 14 (the reference position RP and the trajectory line of the work target portion B). The input receiving section 50 can also be omitted from the embodiment illustrated in FIG. 2. For example, the memory 42 may store the shift amount $\delta$ in advance as a required value.

Figure 8:
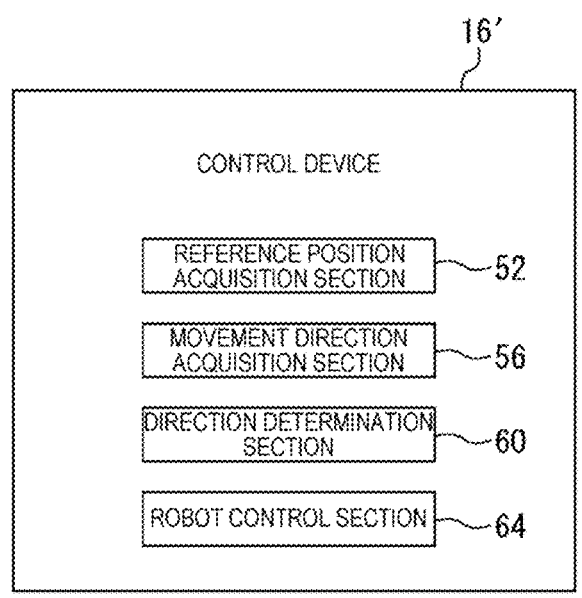
FIG. 8 is a block diagram of a control device according to another embodiment.

FIG. 8 illustrates a control device 16' in which the input receiving section 50, the robot position acquisition section 54, the coordinate system setting section 62, and the reference direction setting section 58 are omitted. The control device 16' includes the reference position acquisition section 52, the movement direction acquisition section 56, the direction determination section 60, and the robot control section 64 described above. For example, the control device 16' is a computer having a processor and a memory, and the processor functions as the movement direction acquisition section 56, the direction determination section 60, and the robot control section 64.

In this control device 16', the direction determination section 60 may determine the shift direction $SD_n$ as, for example, a direction orthogonal to the movement direction $MD_n$ and parallel to the xy plane of the work piece coordinate system CW (or the robot coordinate system CR) or a direction inclined by a predetermined angle $\theta$ with respect to the movement direction $MD_n$. Although the present disclosure has been described above through embodiments, the embodiments described above do not limit the invention according to the claims.

REFERENCE SIGNS LIST

10 Robot system
12 Robot
14 Sensor
16, 16' Control device
40 Processor
52 Reference position acquisition section
54 Robot position acquisition section
56 Movement direction acquisition section
58 Reference direction setting section
60 Direction determination section
62 Coordinate system setting section
64 Robot control section

The invention claimed is:

1. A control device configured to move a robot and causing the robot to perform a work onto a work target portion, the control device comprising:

a reference position acquisition section configured to acquire a position of the work target portion as a reference position, based on detection data of a sensor configured to detect the work target portion;

a movement direction acquisition section configured to acquire a movement direction of the robot;

a direction determination section configured to determine a shift direction in which a working position of the robot onto the work target portion is to be shifted from the reference position, based on the movement direction acquired by the movement direction acquisition section; and a robot control section configured to position the robot at a target position shifted from the reference position acquired by the reference position acquisition section toward the shift direction determined by the direction determination section by a predetermined shift amount, when carrying out the work onto the work target portion.

2. The control device of claim 1, further comprising a reference direction setting section configured to set a direction orthogonal to the movement direction as a reference direction, wherein the direction determination section determines the shift direction as a direction orthogonal to the movement direction and the reference direction.

3. The control device of claim 2, wherein the reference direction setting section sets the reference direction as a direction parallel to an axial direction of a control coordinate system for controlling the robot.

4. The control device of claim 2, further comprising a coordinate system setting section configured to set a correction coordinate system having a first axis parallel to the movement direction, a second axis parallel to the reference direction, and a third axis parallel to the shift direction, wherein the robot control section generates, with reference to the correction coordinate system, a position correction command for correcting a position at which the robot is to be positioned for the work from a teaching position of the robot defined in a work program for causing the robot to perform the work to the target position.

5. The control device of claim 1, further comprising a robot position acquisition section configured to repeatedly acquire a position of the robot while the robot is moving, wherein the movement direction acquisition section acquires the movement direction, using a first position of the robot acquired by the robot position acquisition section and a second position of the robot acquired by the robot position acquisition section before the first position.

6. The control device of claim 1, further comprising an input receiving section configured to receive input information of the shift amount.

7. A robot system comprising:

a robot configured to perform a work onto a work target portion;

a sensor configured to detect the work target portion; and the control device of claim 1.

8. The robot system of claim 7, wherein the sensor is provided on the robot to detect the work target portion at a position frontward of the working position in the movement direction, and the reference position acquisition section acquires the reference position based on the detection data detected by the sensor at the position frontward of the working position.

9. A control method of moving a robot and causing the robot to perform a work onto a work target portion, the control method comprising:

acquiring a position of the work target portion as a reference position, based on detection data of a sensor configured to detect the work target portion;

acquiring a movement direction of the robot;

determining a shift direction in which a working position of the robot onto the work target portion is to be shifted from the reference position, based on the acquired movement direction; and positioning the robot at a target position shifted from the acquired reference position toward the determined shift direction by a predetermined shift amount, when carrying out the work onto the work target portion.

10. A computer program configured to, in order to move a robot and cause the robot to perform a work onto a work target portion, cause a computer to function as:

a reference position acquisition section configured to acquire a position of the work target portion as a reference position, based on detection data of a sensor configured to detect the work target portion;

a movement direction acquisition section configured to acquire a movement direction of the robot;

a direction determination section configured to determine a shift direction in which a working position of the robot onto the work target portion is to be shifted from the reference position, based on the movement direction acquired by the movement direction acquisition section; and a robot control section configured to position the robot at a target position shifted from the reference position acquired by the reference position acquisition section toward the shift direction determined by the direction determination section by a predetermined shift amount, when carrying out the work onto the work target portion.

* * * * *